Aug. 22, 1950      M. O. KILPATRICK      2,519,378
APPARATUS FOR MEASURING VISCOSITY
Filed April 26, 1946      3 Sheets-Sheet 3
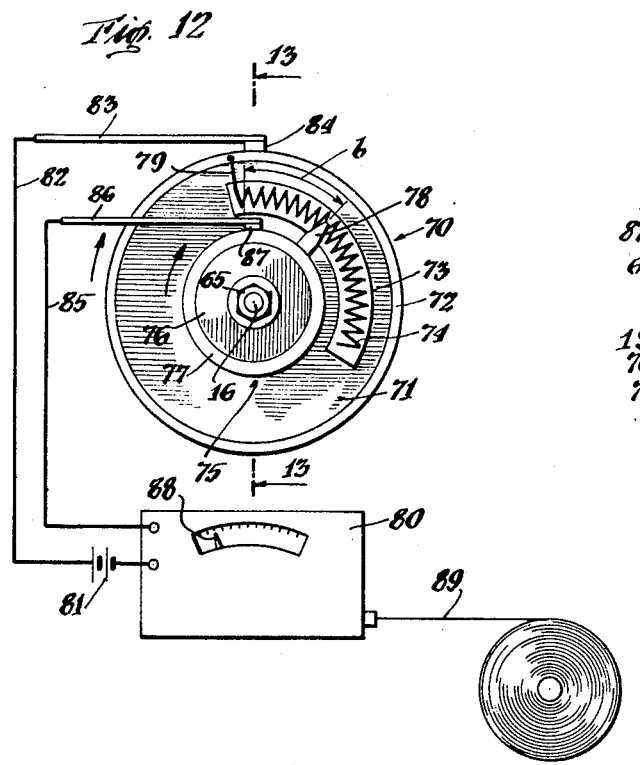
INVENTOR
Myron O. Kilpatrick
BY
Austin, Wilhelm Carlson
ATTORNEYS Patented Aug. 22, 1950

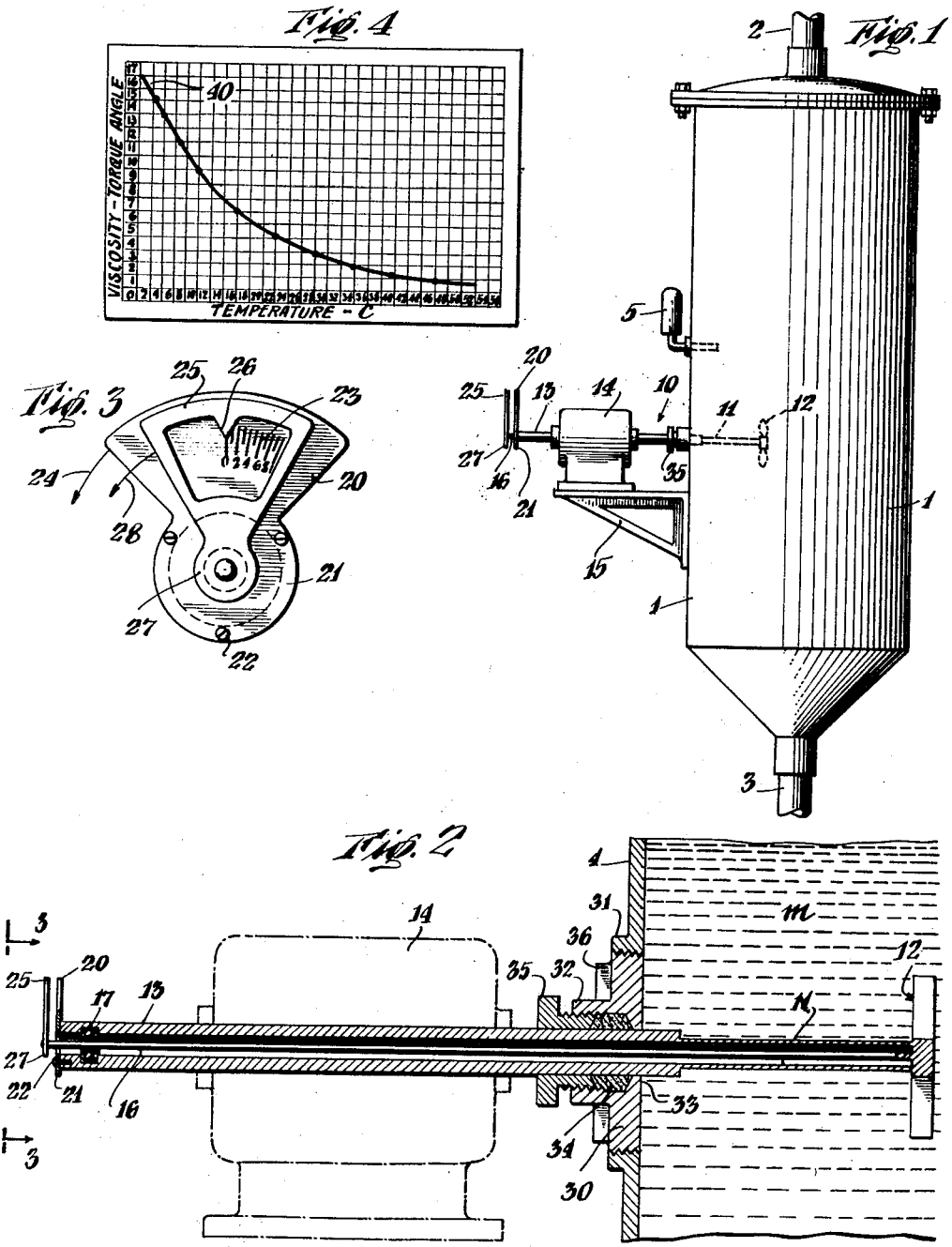

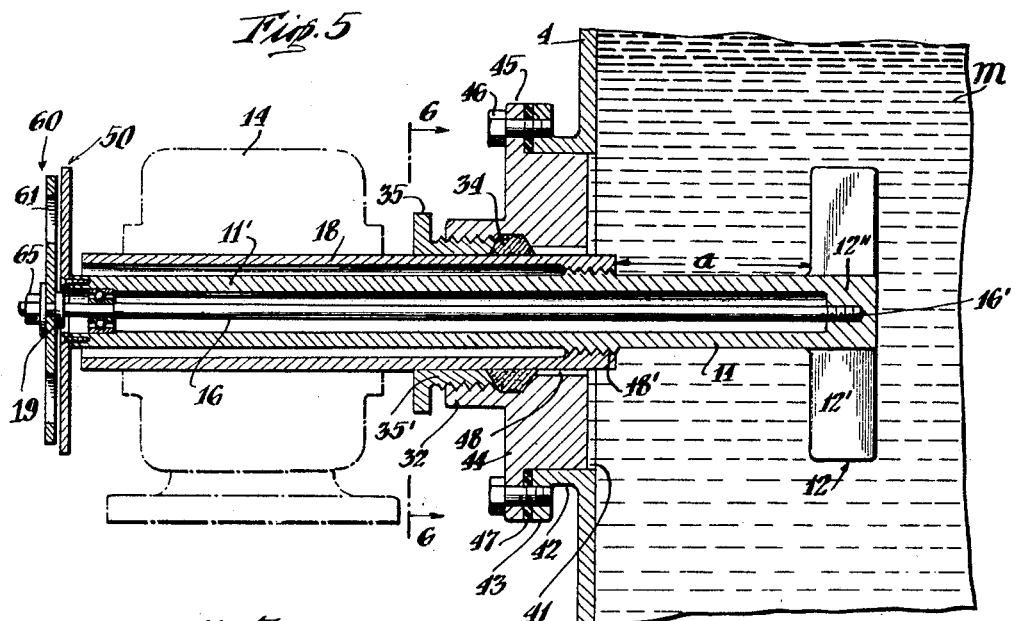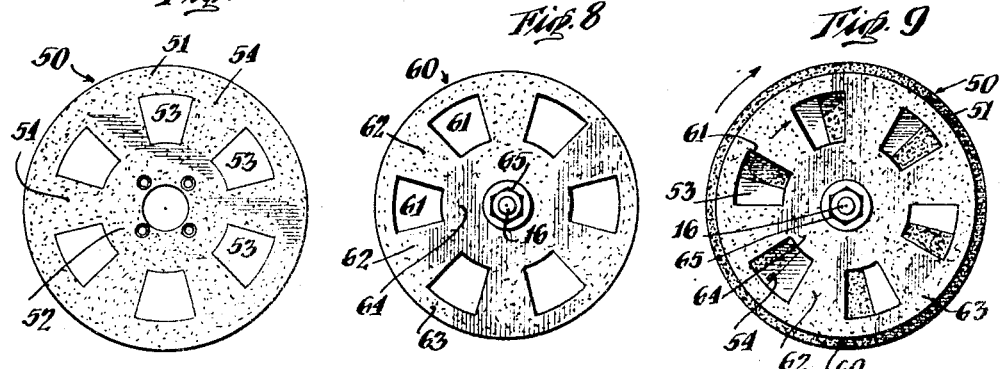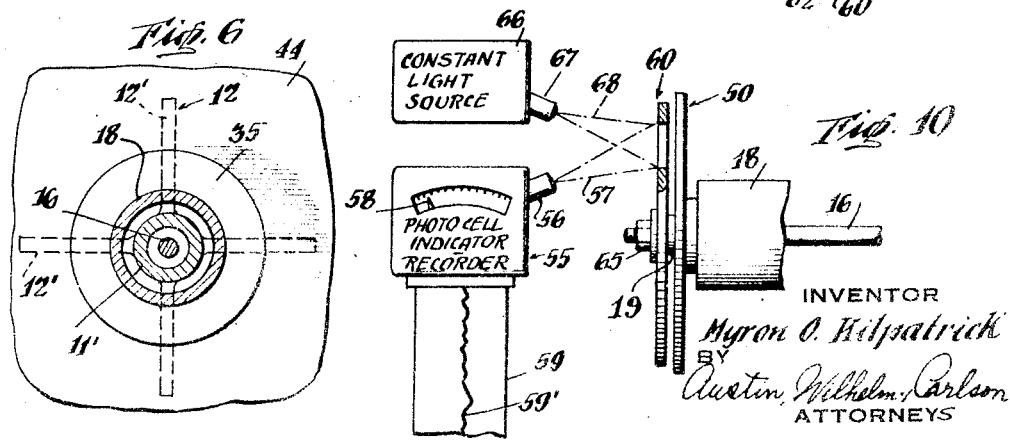

2,519,378

UNITED STATES PATENT OFFICE 2,519,378

APPARATUS FOR MEASURING VISCOSITY

Myron O. Kilpatrick, Bartlesville, Okla., assignor to Phillips Petroleum Company, a corporation of Delaware Application April 26, 1946, Serial No. 665,046

8 Claims. (Cl. 73—59)

This invention relates to an improved apparatus for measuring viscosity and more particularly to a viscosity measuring device designed and adapted for use in association with various processing apparatus for measuring the viscosity of the liquid material during treatment.

In plant processing of various liquid materials it is desirable and often necessary to determine the viscosity of the liquid during various processing stages. For example, plugging of vessels, pumps and lines forming a part of the processing equipment are not infrequent if viscosity of the liquid under treatment in the processing system is not maintained. Viscosity control of the product during processing is also important if the desired physical or chemical reaction of the components under treatment is to be effected.

It has heretofore been customary to remove samples of the liquid material at various points or stages in the processing system and making a viscosity determination of the withdrawn samples by laboratory test. Many chemical liquids are highly sensitive to atmospheric humidity, atmospheric temperature, light or other factors to which laboratory tested samples are exposed and which differ from the environment of the liquid material as it moves through the processing system, with the result that laboratory tests of the withdrawn samples do not accurately establish a correct viscosity determination of the liquid in its processing environment. Laboratory tests of liquid samples are also tedious and time consuming, and before the viscosity determination can be completed, large batches of liquid materials of undesired viscosity may have already passed through the processing system before viscosity correction of the materials in process can be made. The delay which inherently results from laboratory testing procedures may result in serious loss or damage to the product run through the processing system, and if the product itself is not damaged or rendered useless, damage to or plugging of the processing equipment may occur before vicosity correction can be made.

In accordance with this invention an improved viscosimeter is provided which may be permanently associated with the processing equipment designed to give a viscosity reading of the liquid materials undergoing processing, and is particularly designed for application to or in processing vessels and lines operating under positive pressure. The viscosimeter instrument comprises a torque tube of predetermined length and torque characteristics which extends into the processing vessel and to which a paddle wheel type impeller is fixedly attached to the extremity thereof. A hollow motor shaft of sufficient strength and rigidity to be unaffected by the torque twist of the torque tube is secured to the torque tube and extends through the wall of the processing vessel for a distance exterior thereof. A constant speed motor supported adjacent to the vessel wall is operably connected to the hollow motor shaft so as to drive the torque tube and the impeller contained within the processing vessel at a constant predetermined speed. A suitable closure cap attached to the vessel wall provides a supporting bearing for the motor shaft and prevents leakage of the liquid materials around the rotatable motor shaft. A strong rod is contained within the hollow torque tube and motor shaft and the inner end thereof is securely attached to the impeller. The rod is sufficiently sturdy to resist torque twist and will accurately reflect the rotation of the impeller by reason of its protected position within the hollow motor shaft and torque tube.

Suitable indicating devices are attached to the outer end of the motor shaft and rod for measuring the angle of twist between the undeformed rod and the torque deformable torque tube when the impeller is rotated within the liquid. Since the viscosity of fluids is the measure of resistance to fluid shear at any temperature, a temperature indicating instrument is preferably associated with or positioned adjacent the viscosimeter instrument to accurately record the temperature of the liquid materials within the processing vessel at a point adjacent the torque tube. A graph or chart may be provided to indicate the optimum or desired viscosity characteristics of the liquid product at varying temperatures. By taking a temperature reading of the liquid product in process, the chart will disclose the optimum viscosity which the liquid product should have at that temperature, and a reading of the viscosimeter instrument will indicate the actual viscosity of the product under treatment. If the actual viscosity of the product under treatment, as indicated by the viscosimeter instrument, varies to a critical degree from the desired or optimum viscosity as indicated by the chart, steps can be immediately taken to correct the viscosity of the liquid product under process with minimum loss of time and with a minimum delay in production operations, and minimum damage to the product or equipment.

An object of this invention is to provide an improved apparatus for measuring and determining the viscosity of liquid materials in process.

Another object of this invention is to provide an improved viscosimeter instrument which may be connected to a processing system at any desired location designed to accurately measure and record the viscosity characteristics of the liquid material in process at any and all times without removing the material from its process environment.

A further object of this invention is to provide an improved instrument for measuring and recording the viscosity of liquid products contained in processing vessels or lines under positive pressures without removing the liquid product from its processing environment or otherwise disturbing or complicating the viscosity measurement by conditions which do not constitute a part of the process environment.

Other objects and advantages of this invention will become apparent as this disclosure proceeds.

Although the characteristic features of this invention will be particularly pointed out in the claims appended hereto, the invention itself and the manner in which it may be carried out, may be better understood by referring to the following description taken in connection with the accompanying drawings forming a part hereof, in which Fig. 1 is a diagrammatic illustration of a vessel forming a part of a processing system having associated therewith as a permanent part thereof an improved viscosimeter instrument for measuring and indicating the viscosity of the liquid product under treatment.

Fig. 2 is an enlarged cross sectional view of a fragmentary part of the processing vessel and the associated viscosimeter instrument, this view showing more particularly the structural details of the viscosimeter instrument and the means by which it may be attached in a leakproof manner to the vessel wall.

Fig. 3 is an enlarged view of the exterior end of the viscosimeter instrument as viewed in the direction of the arrows 3—3 of Fig. 2, illustrating a simple form of indicator device which may form a part of the viscosimeter instrument;

Fig. 4 is a diagrammatic illustration of one form of chart which may be mounted adjacent the viscosimeter instrument to indicate the optimum or desired viscosity reading at varying temperatures for the liquid product under treatment.

Fig. 5 is an enlarged longitudinal cross sectional view of a viscosimeter instrument of somewhat modified design as it appears when attached to the wall of a processing vessel, the instrument here shown being particularly adapted for association with a photocell indicator and recorder.

Fig. 6 is a transverse cross sectional view of the viscosimeter instrument as it appears when viewed along line 6—6 of Fig. 5.

Fig. 7 is a face view of the background disc attached to the end of the torque tube of the instrument shown in Fig. 5.

Fig. 8 is a face view of the companion shutter disc which is attached to the end of the rod of this instrument.

Fig. 9 is a face view of the torque indicator discs shown in Figs. 7 and 8 as they appear when attached to the adjacent ends of the rotating torque tube and rod to visibly indicate the torque twist to which the torque tube is subjected during rotation.

Fig. 10 is a diagrammatic view of the photo cell indicator and recorder assembly operative to indicate as well as permanently record the torque angle to which the rotating torque tube is subjected as visibly revealed by the cooperating indicator discs associated with the instrument.

Fig. 11 is an elevational view of another form of device which may be associated with the rod and torque tube of the instrument for indicating and recording the torque angle.

Fig. 12 is a front elevational view of the indicating and recording device shown in Fig. 11.

Fig. 13 is a transverse cross sectional view of the electrical contact discs associated with the rod and torque tube of the instrument as the same appears when viewed along line 15—15 of Fig. 12; and Fig. 14 illustrates a chart of modified form which may be mounted adjacent the viscosimeter instrument to indicate the optimum or desired viscosity reading at varying temperatures for the liquid product under treatment.

Similar reference characters refer to similar parts throughout the views of the drawings and specifications.

There is shown in Fig. 1 for purposes of illustration a processing vessel 1 forming a part of a processing system for the treatment of liquid materials whose viscosity is to be controlled. The vessel 1 is connected in the processing system by an inlet conduit 2 and an outlet conduit 3, the liquid material under treatment being indicated by $m$ as shown in Fig. 2. The vessel wall 4 carries a temperature recording instrument 5 which may be of any desired design or construction for measuring and recording the temperature of the liquid material $m$ undergoing process in the vessel 1.

The viscosimeter 10 comprises essentially a torque tube 11 preferably formed of metal of known torque twist characteristics. A plural bladed impeller 12 having flat blades 12' is fixed to the inner end of the torque tube 11 so as to form a fixed part thereof. The torque tube 11 is connected to the end of a hollow motor shaft 13 which is rigidly and sturdily built of suitable metal so as to be uninfluenced by any torque twist by reason of strains imposed thereon during rotation of the impeller 12 in the liquid $m$ whose viscosity is to be measured. A suitable constant speed motor 14 is connected to the hollow motor shaft 13 and is mounted exterior to the processing vessel 1 upon a suitable supporting bracket 15. When the motor 14 is thrown into operation to rotate the hollow motor shaft 13, the torque tube 11 and its associated impeller 12 is rotated at the predetermined constant motor speed.

A sturdy rod 16 is contained within the hollow motor shaft 13 and the torque tube 11, and has the inner end thereof firmly secured to the impeller 12 so as to rotate therewith. The outer end of the rod 16 is supported by a suitable bearing 17 contained within the hollow motor shaft 13. The rod 16 is preferably formed of a strong metal such as stainless steel and is of such a character as not to be influenced by torque twist when rotated by the impeller 12 driven by the motor 14 through the torque tube 11. It will be noted that the rod 16 is completely housed and enclosed within the hollow motor shaft 13 of the torque tube 11 and is free of frictional contact therewith so that it may be freely rotated by the driven impeller 12.

A torque twist indicating device is associated with the outer ends of the hollow shaft 13 and the driven rod 16 which may be of any suitable character. By way of example there is shown in Figs. 2 and 3 a simple form of indicating device which comprises a metal plate 20 which may be sector shaped and which is provided with a base portion 21 which is rigidly attached as by securing screws 22 to the outer end of the hollow motor shaft 13. The face of the sector plate 20 is preferably white and may be provided with degree markings 23 in black. An indicator marker 25 having an open center is provided with a base portion 27 which is fixedly attached to the outer end of the rod 16. The marker 25 is provided with pointer 26 which overlies the degree markings 23 of the sector plate 20. The pointer 26 is preferably black in color and is set to directly overlie the zero marking on the sector plate 20 when the viscosimeter instrument is not driven.

It is to be noted that when the motor 14 is thrown into operation so as to drive the impeller 12, that the sector plate 20 rotates in the direction of the arrow 24 as shown in Fig. 3 and the rod 16 rotates the indicator plate 25 in the same direction as indicated by the arrow 28. However, the torque twist in the torque tube 11 caused by viscosity resistance to rotation of the impeller 12 will cause a corresponding angular displacement of the sector plate 20 with respect to the indicator plate 25 so that the pointer 26 will then overlie a corresponding angular marking on the face of the sector plate 20. The indicator reading can be taken by the use of a stroboscope during rotation of the sector plate 20 and the indicator plate 25. It will be appreciated that the driving motor 14 may be driven continuously, or may be thrown into operation only when a viscosity reading is to be taken.

The torque tube 11 and impeller 12 may be removably attached to the wall 4 of the vessel 1 by the provision of a closure cap 30 which has threaded engagement with a surrounded threaded boss 31 associated with a vessel wall 4. The closure cap 30 may be provided with a laterally projecting collar 32 through which the hollow motor shaft 13 extends. The closure cap 30 may be provided with a bearing lip 33 having snug fitting contact with the outer surface of the motor shaft 13. The cavity within the collar portion 32 may be packed with a lubricating material 34 to provide a packing gland, the lubricating material 34 being inclosed within the collar 32 by a threaded screw cap 35. Thus a sealed and leakproof bearing is provided for the motor shaft 13. The closure cap 30 may be provided with suitable lugs 36 which may be manipulated by a suitable tool to attach and detach the same from the vessel wall 4 and thereby permit insertion and removal from the vessel of the impeller 12 and the associated torque tube 11.

In taking a viscosity measurement, the motor 14 is thrown into operation so as to rotate the impeller 12 and the torque tube 11 at the constant motor speed. The viscosity characteristics of the liquid m contained in the processing vessel 1 exerts a predetermined resistance to the rotation of the impeller 12 which imposes a torque strain and a resulting torque twist on the torque tube 11. The angle of twist of the torque tube 11 can be read on the indicator device such as shown in Fig. 3 and the angle of twist observed by the use of a stroboscope. The temperature reading of the liquid m is taken from the temperature recording instrument 5 and reference is then made to the viscosity chart mounted adjacent to vessel 1 as shown in Fig. 4. The chart as shown in Fig. 4 has plotted thereon a temperature viscosity curve 40 which accurately indicates the desired or optimum viscosity which the liquid material should possess at varying temperatures. The viscosity readings on the chart shown in Fig. 4 may be plotted in terms of torque angle or any other standard of measurement possessed by the indicator device. If the viscosity reading as taken from the indicator device varies to any critical degree from the optimum viscosity as indicated by the graph or chart, steps are taken to correct the viscosity of the liquid under treatment.

There is shown in Figs. 5 to 10 inclusive a highly desirable form of viscosity metering instrument assembly which can be advantageously employed both for measuring and permanently recording the viscosity of liquids undergoing treatment. As shown in Figs. 5 and 6, the torque tube 11 extends through the vessel wall 4 and carries a bladed impeller 12 firmly secured to the inner end thereof. The impeller blades 12' shown as four in number, are relatively flat and are so designed as to impose no thrust upon the torque tube 11. The torque tube 11 as an extension 11', and a background disc 50 is detachably secured to the outer end thereof. The motor 14 is mounted on a separate tubular motor shaft 18 which encases the torque tube extension 11'. The tubular motor shaft 18 is detachably secured to the torque tube 11 at a point adjacent the vessel wall 4 in any suitable manner as by a threaded connection 18'. Thus the torque tube 11 and its extension 11' may be easily detached and replaced. The torque twist to which the torque tube 11 is subjected by the rotation of the impeller 12 will be found in the length a of the torque tube as shown in Fig. 5, and torque in the tubular motor shaft 18 does not effect the reading. The torque tube 11 is preferably formed of metal and of known torque twist characteristics.

The rod 16 as shown in Fig. 5 has a threaded end 16' which permits the rod to be firmly and yet detachably secured to the hub portion 12" of the bladed impeller 12. A shutter disc 60 is attached to the outer end of the rod 16 in a manner to overlie the background disc 50 attached to the adjacent end of the torque tube extension 11'. The rod 16 may be provided with a shoulder portion 19 against which the shutter disc 60 seats, the shutter disc 60 being held in fixed position by suitable lock nut 65 attached to the projecting end of the rod. The rod is of such sturdy design so as to suffer no deformation during rotation. Since the rod 16 is enclosed within and protected by the torque tube 11 and its extension 11', no appreciable strain is imposed thereon. The torque tube 16 may be easily removed and replaced when desired.

The torque tube 11 and its extension 11', the tubular motor shaft 18, the rod 16 and the impeller 12 may be removably attached to the vessel wall 4 by the provision of a modified form of closure cap 44 designed to provide a non-leak connection. The vessel wall 4 has an opening 41 sufficiently large to permit insertion and removal of the impeller 12. The vessel wall 4 has a projecting collar portion 42 surrounding the opening 41 and a flared flange 43 to which the collar 44 may be conveniently attached. The closure cap 44 is provided with a heavy body which snugly fits within the vessel opening 41, the opening being sealed by a suitable gasket 47. The end of the tubular motor shaft 18 extends through the body of the closure cap 44 and fits within a sleeve bearing 48. The closure cap 44 is provided with a flared flange 45 adapted to be detachably secured to flared flange 43 of the vessel wall, as by detachable bolts 46.

The closure cap 44 may be provided with a laterally projecting collar 32 through which the tubular motor shaft 18 extends. The collar 32 has a cavity which may be packed with a lubricating material 34, providing a packing gland. The lubricating material 34 is enclosed by a screw cap 35 which has a sleeve bearing 35' in which the motor shaft 18 snugly fits. A sealed and leak proof bearing is thus provided for the motor shaft. The closure cap 44 also provides a leak proof plug for the vessel opening 41 which may be detached from the vessel wall 4 by removing the securing bolts 46.

The torque indicating device associated with the instrument shown in Fig. 5 comprises the background disc 50 firmly attached to the outer end of the torque tube extension 11' and the superimposed shutter disc 60 secured to the end of the rod 16. The background disc 50, as shown in Fig. 7, has an outside face which has black and white markings. The white markings 53 appear as sector shape segments, separated by black segments 54 of substantially the same shape and size as the white segments 53. The white and black segments 53 and 54 are bordered by a black outer rim 51, and a black inner rim 52.

The shutter disc 60, as shown more particularly in Fig. 8, is attached to the outer end of the rod 16, and is designed to overlie the black and white face of the underlying background disc 50. The shutter disc 60 has a plurality of sector shaped openings 61 cut therein which are the same shape and size as the black faced segments 54 of the background disc 50. The sector shaped openings 61 in the shutter disc 60 are spaced by sector shaped webs 62 having a black face of the same shape and size as the white faced sectors 53 of the underlying disc 50. The face of the shutter disc 60 is also rimmed by an outer black band 63 and an inner black band 64. The nut 65 and the end of the rod 16 to which it is attached, also possess a jet black face.

The shutter disc 60 is secured to the end of the rod 16 in a manner so that the sector shaped openings 61 thereof are directly in alignment with the black faced sectors 54 of the background disc 50, and the black faced sectors 62 of disc 60 cover and conceal the white faced sectors 53 of the underlying disc 50, when the instrument is not in operation. When the torque tube 11 is rotated by the motor 14, the impeller 12, rotating in the liquid whose viscosity is to be measured, imposes a predetermined twist on the torque tube 11, causing the background disc 50 to correspondingly lag in its rotation as shown in Fig. 9. The rod 16 is so sturdily designed that the shutter disc 60 attached to the end thereof will not lag during rotation. The angular lag of the background disc 50, resulting from the torque twist imposed upon the torque tube 11, is revealed and indicated by the degree or area of exposure of the white sectors 53 thereof as made visible through the sector shaped openings 61 of the shutter disc 60, as shown more particularly in Fig. 9. The degree of torque twist to which the torque tube 11 is subjected is therefore visibly indicated by the area of the white faced sectors 53 visible through the sector shaped openings 61 of the shutter disc 60.

The degree to which the white faced sectors 53 of the rotating background disc 50 are visible through the sector shaped openings 61 of the shutter disc 60 constitutes an accurate measure of the viscosity of the liquid undergoing process, and may be measured and recorded by a photocell 55 as diagrammatically shown in Fig. 10.

A constant light source 66 is provided having a directive element 67 designed to throw a confined light beam 68 against the face of the rotating shutter disc 60. The photocell 55 has an element 56 which receives light reflected from the area lighted by the beam 68 from the light source 66. The reflected light cone 57 from the illuminated and exposed areas of the white faced sectors 53 of the rotating background disc 50, visible through the sector shaped openings 61 of the shutter disc 60, actuates the photocell 55 in accordance with the degree of white exposure. The degree of white exposure constitutes an accurate measure of the torque angle which the viscosity of the liquid imposes upon the torque tube 11 when rotated by the motor 14. The photocell 55 may be a plate voltaic type or a photoemissive type cell, which cells with necessary auxiliaries are well known in the art. The photocell 55 is equipped with a dial indicator 58 from which the torque reading may be directly made, and the photocell may also be provided with devices to feed out a continuous ribbon 59 upon which a line graph 59' of the torque angle is recorded. Thus, by using this system, the torque angle is visibly indicated and permanently recorded. The torque angle indicated by the photocell 55 can be translated into terms of viscosity by the use of a suitable chart prepared to conform to the characteristics of the instrument.

There is shown in Figs. 11 to 13 inclusive a further modified form of indicating and recording system which may be advantageously employed in measuring the torque angle or torque twist to which the delicate torque tube 11 is subjected when its impeller 12 rotates in the liquid whose viscosity is to be measured. The indicating and recording system, illustrated in Figs. 11 to 13 inclusive, is operatively connected to the torque tube extension 11' and the rod 16 of the viscosimeter instrument, and embodies the use of a rheostat and ammeter arrangement for measuring, indicating and recording the torque angle. In this system, a background disc 70 is firmly secured to the end of the torque tube extension 11' and a smaller disc 75, fixed to the end of the instrument rod 16, is positioned to overlie the disc 70. The disc 70 has a center section 71 formed of strong but non-conducting material to which a current conducting rim 72 is firmly secured.

The companion superimposed disc 75 seats against the collar portion 19 of rod 16 and is secured thereto as by a lock nut 65. The central section 76 of the superimposed disc 75 is formed of non-conducting material and is also provided with a current conducting rim 77 bonded thereto. A metal pointer 78 is fixed to the conducting rim 77 of the superimposed disc 75. The end of the pointer 78 is designed to slide in contact with a rheostat plate 73 of generally arcuate shape which is mounted on the non-conducting center section 71 of the background disc 70. The rheostat plate 73 is provided with the usual resistance wiring 74 which is connected at one end 79 thereof to the conducting rim 72 of the background disc 70.

An indicating and recording ammeter instrument 80 is connected by wiring 82 and 85 to a current source of known ammeter rating, such as a battery 81. One of the lead wires 82 is electrically connected to a contact arm 83 having a shoe or roller 84 which slides or rides on the conducting rim 72 of the background disc 70. The other wire 85 leads from the ammeter instrument 80 to a contact arm 86 having a shoe or roller 87 which rides on the conducting rim 77 of the superimposed disc 75.

When the viscosimeter instrument is in operation, the angle of twist of the torque tube 11 is reflected in a certain angle of lag in the rotating background disc 70, as indexed by the superimposed disc 75 fixed to the non-deformable rotating rod 16, and the rheostat plate 73 will slip rearwardly with the rotating background disc 70, as shown more particularly in Fig. 12, an angular distance which is the measure of the twist in the torque tube 11 imposed by the viscosity of the liquid under measurement. Current flows from the battery 81 through lead wire 82, through the contact arm 83, to the conducting rim 72 of the background disc 70, and thence into the current shunt resistance wire 74 of the rheostat plate 73. Current flows from the rheostat wire 74, through the pointer 78, through the conducting rim 77 of the superimposed disc 75, thence through contact arm 86, through the lead wire 85, and to the ammeter instrument 80.

Assuming the discs 70 and 75 rotate in the direction of the arrows as shown in Fig. 12, it will be appreciated that the torque twist in the torque tube 11 causes the background disc 70 to slip counter-clockwise an angular distance b corresponding to the torque twist of the torque tube 11, as measured by the distance between the head end 79 of the rheostat wire and the pointer 78. The resistance offered to current flow shunted through the segment of the resistance wire located in space b, is reflected by the indicating and recording ammeter 80, which may be calibrated to indicate torque angle. The ammeter 80 may be provided with a pointer 88 to visually indicate the torque angle, and may also be provided with devices to feed a ribbon 89 on which the variations in torque angle are suitably defined as by a scribe line 89'.

A modified form of chart 90 from which torque angle readings may be translated to viscosity of the liquid, as measured in centipoises at any given temperature of the liquid, is illustrated in Fig. 14. Thus by taking a temperature reading of the liquid under treatment, and a torque angle reading taken from the photocell system shown in Figs. 5 to 10 inclusive, or from the rheostat and ammeter system as shown in Figs. 11 to 13 inclusive, the viscosity of the liquid under treatment may be immediately determined from the chart 90 shown in Fig. 14. If the viscosity of the liquid under treatment, as indicated by the chart, departs to a serious degree from the optimum desired viscosity at the recorded temperature, measures can immediately be taken to correct the viscosity of the liquid product in process as conditions require.

It will be appreciated that other means for indicating, recording or measuring the torque twist of the torque tube 11 may be provided. For example, the angle of displacement or twist between the torque tube 11 and the rod 16 may be measured by the provision of a pair of Selsyn motors. One of the Selsyn motors would have its stator connected to the torque tube 11 and its rotor connected to the rod 16, and the other Selsyn motor would have its rotor connected to a suitable indicator, recorder and controller device. With such an arrangement, the motors can be made to indicate and record as well as control the processing flow. It will be appreciated that other electrical and mechanical devices may be employed for measuring, indicating and recording the angle of displacement between the torque tube 11 and the rod 16, and which the above disclosure will suggest to those skilled in the art.

While certain novel features of the invention have been disclosed and are pointed out in the annexed claims, it will be understood that various omissions, substitutions and changes may be made by those skilled in the art without departing from the spirit of this invention.

What is claimed is:

1. A viscosimeter adapted to be associated with a vessel containing liquid in process which includes, a torque tube of known torque twist characteristics contained within the vessel in the liquid environment, a bladed impeller fixed to said torque tube in contact with the liquid, a hollow shaft fixed to said torque tube and extending through the vessel wall, means exterior to said vessel for driving said hollow shaft at constant speed, a rigid rod extending through said hollow shaft and torque tube fixed to said impeller, and indicator means connected to said hollow shaft and said rod operative to indicate the angle of twist of said torque tube when said impeller is rotated.

2. A viscosimeter adapted to be associated with a vessel containing liquid in process which includes, a torque tube of known torque twist characteristics contained within the liquid environment, a bladed impeller fixed to the end of the torque tube in contact with the liquid, a rigid hollow shaft fixed to said torque tube and extending through the vessel wall, means exterior to said vessel for driving said hollow shaft at constant speed, a rod extending through said hollow shaft and torque tube having one end thereof fixed to said impeller, and indicator means exterior to the vessel for indicating the angle of twist of said torque tube when said impeller is rotated, said indicator including a torque twist indicator plate fixed to the exterior end of said hollow shaft to rotate therewith, and an indexing member fixed to the end of said rod to rotate therewith overlying said indicator plate.

3. A viscosimeter for measuring the viscosity of liquids which includes, a torque tube of known torque twist characteristics, an impeller designed to be contained within the liquid environment and fixed to said torque tube, means for driving said torque tube at constant speed, a rigid rod extending through said torque tube fixed to said impeller, and indicator means connected to said torque tube and said rod operative to indicate the angle of twist of said torque tube when said impeller is rotated.

4. A viscosimeter for measuring the viscosity of liquids which includes, a torque tube of known torque twist characteristics, an impeller designed to be contained within the liquid environment and fixed to one end of said torque tube, means operably connected to the other end of said torque tube for rotating the impeller by means of said torque tube, a rigid rod extending through said torque tube and having one end thereof fixed to said impeller, and indicator means having a part operably connected to said other end of the torque tube and a part connected to the other end of said rod operative to indicate the angle of twist of said torque tube when said impeller is rotated.

5. A viscosimeter adapted to be associated with a vessel containing liquid in process which includes, a torque tube of known torque twist characteristics extending into the liquid environment, an impeller fixed to the interior end of the torque tube in contact with the liquid, driving means operably connected to the exterior end of the torque tube for rotating the impeller through said torque tube at substantially constant speed, a rod extending through said torque tube having the interior end thereof fixed to said impeller, and indicator means operably connected to the respective exterior ends of said torque tube and said rod for indicating the angle of twist of said torque tube when said impeller is rotated by said driving means.

6. A viscosimeter adapted to be associated with a vessel containing liquid in process which includes, a torque tube of known torque twist characteristics extending into the liquid environment, an impeller fixed to the interior end of the torque tube in contact with the liquid, a rigid hollow shaft fixed to the exterior end of said torque tube, a motor supported exterior to said vessel for driving said hollow shaft and torque tube at substantially constant speed, a rod extending through said torque tube having the interior end thereof fixed to said impeller, and indicator means operably connected to the exterior ends of said torque tube and rod for indicating the angle of twist of said torque tube when said impeller is rotated by said motor.

7. A viscosimeter apparatus adapted to be associated with a vessel containing liquid in process which includes, a torque tube of known torque twist characteristics extending into the liquid environment, an impeller fixed to the torque tube in contact with the liquid, a rigid hollow shaft fixed to said torque tube and extending through an opening in the vessel wall, a sealed bearing assembly mounted within the opening in the vessel wall providing a bearing support for said hollow shaft, means exterior to said vessel for driving said hollow shaft and torque tube, a rigid rod extending through said torque tube having one end thereof fixed to said impeller, and indicator means having a part connected to said torque tube and a part connected to said rod for indicating the angle of twist of said torque tube when said impeller is rotated by said driving means.

8. A viscosimeter apparatus adapted to be associated with a vessel containing liquid in process which includes, a torque tube of known torque twist characteristics extending into the liquid environment, an impeller fixed to one end of the torque tube in contact with the liquid, a rigid hollow shaft fixed to the other end of said torque tube and extending through an opening in the vessel wall, a sealed bearing assembly mounted within the opening in the vessel wall providing a bearing support for said hollow shaft and torque tube, a motor supported exterior to said vessel for driving said hollow shaft and torque tube at substantially constant speed, a rod extending through said torque tube and hollow shaft and having one end thereof fixed to said impeller, and indicator means exterior of the vessel including a part operably connected to said torque tube and a part operably connected to said rod for indicating the angle of twist of said torque tube when said impeller is rotated by said motor.

MYRON O. KILPATRICK.

REFERENCES CITED

The following references are of record in the file of this patent:

UNITED STATES PATENTS

| Number | Name | Date |
|---|---|---|
| 1,061,372 | Guy | May 13, 1913 |
| 1,125,766 | Thompson | Jan. 19, 1915 |
| 1,720,582 | Vieweg | July 9, 1929 |
| 2,160,606 | Thomas | May 30, 1939 |
| 2,254,575 | Kronquest | Sept. 2, 1941 |
| 2,344,331 | Swift et al. | Mar. 14, 1944 |